United States Patent [19]

Kitamura

[11] Patent Number: 5,136,284
[45] Date of Patent: Aug. 4, 1992

[54] SECURITY SYSTEM

[75] Inventor: Midori Kitamura, Itami, Japan

[73] Assignee: Mitsubishi Denki Kabushiki Kaisha, Japan

[21] Appl. No.: 453,265

[22] Filed: Dec. 21, 1989

Related U.S. Application Data

[63] Continuation of Ser. No. 164,017, Mar. 4, 1988, abandoned.

[30] Foreign Application Priority Data

Mar. 6, 1987 [JP] Japan .................. 62-52710

[51] Int. Cl.$^5$ .............................. H02B 1/00
[52] U.S. Cl. ................... 340/825.31; 340/825.34; 307/10.5; 235/382.5; 70/252
[58] Field of Search ........... 340/825.31, 825.3, 825.34; 70/252, 263; 235/382.5; 307/10.1, 10.2, 10.3, 10.4, 10.5

[56] References Cited

U.S. PATENT DOCUMENTS

| | | | |
|---|---|---|---|
| 4,213,118 | 7/1980 | Genest et al. | 235/382.5 |
| 4,446,380 | 5/1984 | Moriya et al. | 307/10 AT |
| 4,761,645 | 8/1988 | Mochida | 340/825.34 |

FOREIGN PATENT DOCUMENTS

| | | |
|---|---|---|
| 60-220489 | 11/1985 | Japan . |
| 61-117375 | 6/1986 | Japan . |
| 61-151778 | 7/1986 | Japan . |
| 8700233 | 1/1987 | PCT Int'l Appl. . |

Primary Examiner—Alvin E. Oberley
Assistant Examiner—Richard Hjerpe
Attorney, Agent, or Firm—Leydig, Voit & Mayer

[57] ABSTRACT

A security system for controlling the operation of releasing a lock mechanism for locking a steering mechanism of a mobile medium such as a vehicle. This system is provided with at least one information medium such as a license card on which information which identifies the operator of the mobile medium stored, a reading device for reading out the information stored in the information medium, a memory device in which information which is the same as the information stored on the information medium is stored previously and a comparing device which compares an output from the reading device with the contents of the memory device and which outputs a lock-release signal for releasing the lock mechanism when a match occurs in this comparison. The security system further may include writing means by which the contents of the memory device may be rewritten if the output of the reading device coincides with the contents of the memory device.

4 Claims, 2 Drawing Sheets

SECURITY SYSTEM

This application is a continuation of application Ser. No. 07/164,017, filed Mar. 4, 1988, now abandoned.

BACKGROUND OF THE INVENTION

This invention relates to a security system for a mobile medium such as an automobile or electric-powered car or train.

FIG. 1 shows an example of a conventional system of this kind applied to a vehicle. A steering mechanism 1 of the vehicle is provided with a lock mechanism 2. When the lock mechanism 2 is actuated, the steering wheel 1a can not rotate and so directional control of the vehicle is not possible. In the lock mechanism 2, when an electromagnet 5 is energized, a pin 6 is pulled out of a shaft hole 7 of a steering shaft 1b. The electric power is supplied to the lock mechanism 2 from a power source (not shown) via key switch 3 and a safety switch 4.

To start a vehicle having the thus-constructed mechanism, a key is inserted into the key switch 3 and is turned so as to turn on the key switch 3. In this state, the electromagnet 5 is not supplied with electricity and the steering wheel 1a is still in its locked state and cannot be rotated, since the safety switch 4 is still open. If, at this point, the safety switch 4 is pressed, the energizing circuit of the electromagnet 5 is activated so that the pin 6 is pulled out of the shaft hole 7, thereby enabling the steering mechanism 1 to operate. If, in this state, the engine is started, the vehicle is capable of being controlled directionally while on the move.

The thus-arranged conventional security system is defective in that, if the wires connected to the pair of terminals of the key switch are cut and thereafter the pair of terminals are directly connected to each other and the safety switch 4 is passed, the vehicle can be steered and made to move and, therefore, can be stolen easily. A complicated security switch arrangement can be applied in order to prevent the vehicle from being stolen. However, if the switch arrangement is complicated, the operation of releasing the lock becomes troublesome, resulting in a reduction of normal operating ease.

SUMMARY OF THE INVENTION

The present invention has been achieved with a view to overcoming the above-described problem, and an object of the present invention is to provide a security system which reliably prevents theft and other unauthorized use, without requiring complicated operation.

Accordingly, the present invention provides a security system for controlling a steering lock mechanism of a vehicle, the security system comprising at least two information media, a reading device, a memory device, a comparator, an operator-actuated write-enable switch, and a writing apparatus. Each information media has information identifying an operator. The reading device reads the information on an information medium presented to the reading device, and the memory device stores predetermined information. The comparator is coupled to the reading device and to the memory device and compares the information read by the reading device to the predetermined information in the memory and, if they match, issues a first signal from an output of the comparator to the steering lock mechanism. The writing apparatus is coupled between the reading device and the memory device and is operatively connected to the output of the comparator and the write-enable switch. The writing apparatus writes the information read by the reading device in the memory device in accordance with the status of the write-enable switch and the output of the comparator. The writing apparatus includes a writing device and a write gate coupled to the writing device and to the output of the comparator. The write gate connects the writing device to the memory device when the comparator detects a match and the write-enable switch is actuated. The writing apparatus further includes a temporary memory for temporarily storing the output of the comparator. The temporary memory and the write-enable switch are coupled in series between the output of the comparator and the write gate.

In accordance with the present invention, information stored on the license card is read by the reading device, this information is compared with the information previously registered and stored in the memory device, and the lock is released only when the former information and the latter information match.

DESCRIPTION OF THE PREFERRED EMBODIMENT

Figure 2:
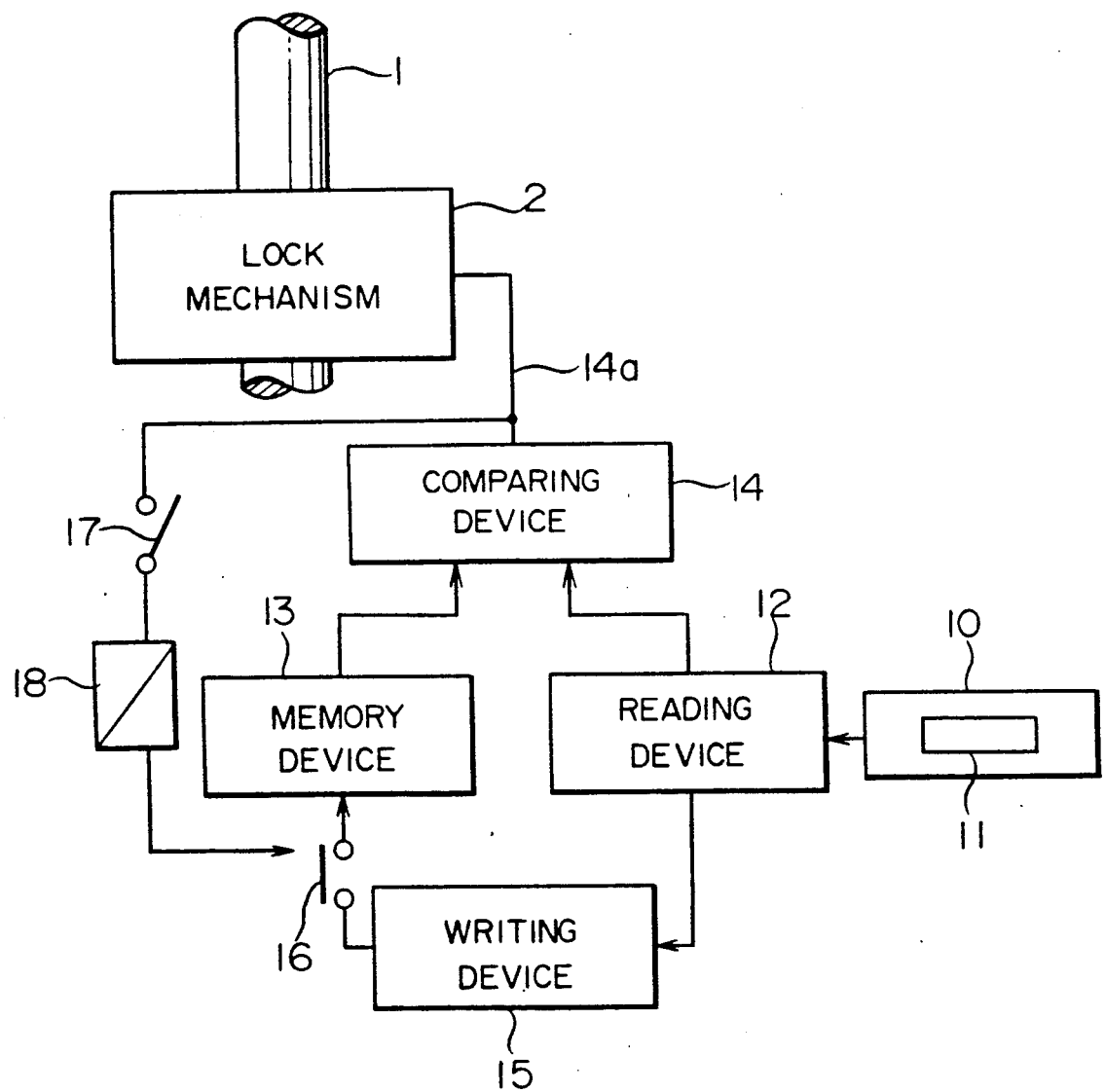
FIG. 2 is an illustration of a security system which represents an embodiment of the present invention.

An embodiment of the present invention will be described below with reference to the accompanying drawings. FIG. 2 shows a security system which represents an embodiment of the present invention and which includes a lock mechanism 2 for locking a steering mechanism 1, and a license card 10 in the form of an IC card which is a portable electronic device. The license card 10 incorporates a semiconductor memory device 11 in which the license number is stored. A reading device 12 is adapted to read the contents of the license card 10, namely, the license number. A memory device 13 which has a semiconductor memory structure is designed to prevent the memory contents from collapsing even if the supply of electricity is interrupted. A comparing device 14 compares the outputs from the reading device 12 and the memory device 13 with each other and outputs a lock-release signal 14a only when these outputs coincide with each other. The system is also provided with a writing device 15 adapted to write the contents from the reading device 12 into the memory device 13, a write gate 16 which enables writing only when it closes, a write-enable switch 17, and a temporary memory device 18 adapted to temporarily store the result of comparison effected by the comparing device 14. The write gate 16 closes when the write-enable switch 17 is closed by being pressed by the operator if a match occurs as the result of comparison in the comparing device 14.

Next, the operation of this system will be described. It is assumed that the license number of the operator of the vehicle is stored in the memory device 13. Correspondingly, as described above, the license number of this person is stored in the semiconductor memory device 11 incorporated in the license card 10. This number is written when the license is issued.

Figure 1:
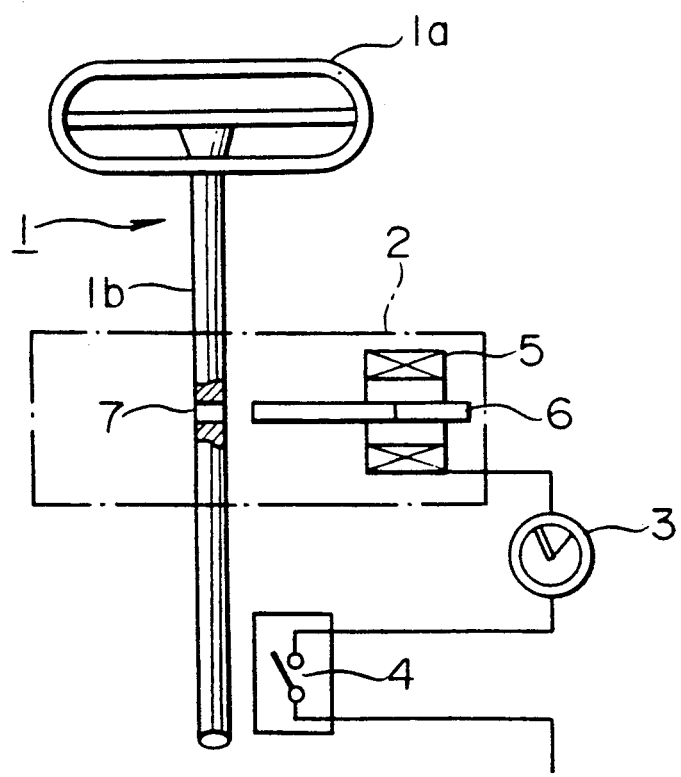
FIG. 1 is a diagram of a conventional security system.

Under this condition, the license card 10 is coupled with the reading device 12, and the reading device 12 detects the coupling of the license card 10 and reads the license number stored in the semiconductor memory device 11. The license number thereby read out is supplied to one of the pair of input terminals of the comparing device 14 and is therein compared with the contents of the memory device 13. If the result of this comparison is a match, the lock-release signal 14a is output from the comparing device 14, and the lock mechanism 2 is released, thereby enabling operation of the steering mechanism. If the result of comparison is not a match, the release signal 14a is not output and the lock is not released. Any method of using the lock-release signal 14a can be used so long as it uses this signal to effect and control magnetization and demagnetization of the electromagnet 5 of the lock mechanism 2 (FIG. 1). For example, this signal may be sent to the lock mechanism via the key switch 3.

The writing device 15 is activated only when a match occurs as the result of comparison in the comparing device 14 while the write-enable switch 17 is closed by the operator. This is needed if the vehicle is lent to another person. That is, if a license card having the same content as that already stored in the memory device 13 is coupled with the reading device 12 and the write-enable switch 17 is thereafter closed by the operator, the result of comparison is temporarily stored in the memory device 18, whereby the write gate 16 is closed, and this closed state is maintained temporarily.

If, at this point, the license card of a person who borrows the vehicle is coupled with the reading device 12, the contents thereof (license number) are written into the memory device 13 via the writing device 15. Therefore, in this state, the lock can be released by the operation of the borrower using his license card alone to enable the steering operation. Thereafter, when the contents of the temporary memory device 18 are erased, the write-enable switch 17 and the write gate 16 are opened, thereby enabling only the person registered in the memory device 13, that is, in this case, the person who borrowed the vehicle from the owner to drive the vehicle. Therefore, if the vehicle is not intended to be lent to another person, it is sufficient to store only the license number of the user in the memory device 13, the writing device 15, the write gate 16, the write-enable switch 17 and the temporary memory device 18 are not necessary.

In accordance with this embodiment, it is necessary to use the license card in order to drive the vehicle, and only persons who have been permitted by the owner to use his vehicle can drive the vehicle. Therefore, theft of the vehicle as well as unauthorized use becomes very difficult. In addition, the registered person can release the lock by only coupling his own license card with the reading device without any troublesome operations. Also, there is no possibility of the user driving the vehicle without carrying the license card.

If the capacity of the memory device 13 is increased, a drive record can also be stored. This record may become further definite when combined with clock information, thereby enabling the prevention of unauthorized use.

Further, when the license numbers of a plurality of operators are stored in the memory device, a plurality of operators can drive the vehicle.

The above-described embodiment exemplifies the case in which the present invention is applied to an ordinary automobile, but the invention can also be applied to a crane. In this case, a qualification certificate or a factory identification number may be used instead of the license card used in the above-described embodiment.

The basic principle of the present invention can be applied to all types of systems having direction, speed or rotation control mechanisms and a lock mechanism for inhibiting the operation thereof, and can be obtained the effects described above respectively.

As described above, in a security system in accordance with the present invention, information which identifies the operator of a mobile medium such as a vehicle is stored in an information medium such as a license card, this information is read by a device provided in the mobile medium and is compared with information previously registered, and the lock mechanism of the mobile medium is released when a match occurs between the former information and the latter information, thereby preventing theft and unauthorized use of the mobile medium while using a simple operation for releasing the lock mechanism.

What is claimed is:

1. A security system for controlling a steering lock mechanism of a vehicle, said security system comprising:
   a plurality of information media having information identifying a plurality of operators, respectively;
   a reading device which reads the information on an information media presented to the reading device;
   a memory device which stores predetermined information;
   a comparator which is coupled to the reading device and the memory device and which compares the information read by the reading device to the predetermined information and, if they match, issues a first signal from an output of the comparator to the steering lock mechanism;
   an operator-actuated write-enable switch; and
   a writing apparatus which is coupled between the reading device and the memory device, which is operatively connected to the output of the comparator and the write-enable switch, and which writes the information read by the reading device in the memory device in accordance with the status of the write-enable switch and the output of the comparator wherein the writing apparatus includes a writing device and a write gate coupled to the writing device and to the output of the comparator, the write gate connecting the writing device to the memory device when the comparator detects a match and the write-enable switch is actuated, and wherein the writing apparatus further includes a temporary memory, the temporary memory and the write-enable switch being coupled in series between the output of the comparator and the write gate and the temporary memory temporarily storing the output of the comparator.

2. A security system according to claim 1 wherein said vehicle is an automobile, and said information medium is an operator's license card in which the license number is stored in a memory therein, said license number being used as the information for identifying an operator.

3. A security system according to claim 1 wherein said vehicle is a crane, and said information medium is a license card in which the number of a qualification certificate for the operation of the crane is stored in a memory therein, said number being used as the information for identifying an operator.

4. A security system according to claim 1 wherein said vehicle is a crane, and said information medium is a certification card in which an identification number is stored in a memory therein, said number being used as the information for identifying an operator.

* * * * *